United States Patent
Yamada et al.

(10) Patent No.: US 9,627,659 B2
(45) Date of Patent: Apr. 18, 2017

(54) RECTANGULAR SECONDARY BATTERY

(71) Applicant: Sanyo Electric Co., Ltd., Daito-shi, Osaka (JP)

(72) Inventors: Masakazu Yamada, Hyogo (JP); Eiji Okutani, Hyogo (JP); Yasuhiro Yamauchi, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 183 days.

(21) Appl. No.: 14/716,193

(22) Filed: May 19, 2015

(65) Prior Publication Data

US 2015/0349299 A1 Dec. 3, 2015

(30) Foreign Application Priority Data

May 30, 2014 (JP) ................. 2014-112096

(51) Int. Cl.
*H01M 2/02* (2006.01)
*H01M 2/14* (2006.01)
*H01M 10/04* (2006.01)

(52) U.S. Cl.
CPC ............ *H01M 2/024* (2013.01); *H01M 2/14* (2013.01); *H01M 10/0468* (2013.01); *H01M 2/0275* (2013.01); *H01M 2/0277* (2013.01); *H01M 2220/10* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2005/0017678 A1* | 1/2005 | Hiratsuka | H01M 2/0215 320/112 |
| 2005/0084749 A1* | 4/2005 | Hwang | H01M 2/0202 429/127 |
| 2006/0099503 A1* | 5/2006 | Lee | H01M 2/0275 429/176 |
| 2006/0163334 A1* | 7/2006 | Kay | B65D 5/248 229/122.32 |
| 2007/0154794 A1* | 7/2007 | Kim | H01M 2/021 429/162 |
| 2007/0202398 A1* | 8/2007 | Kim | H01M 2/021 429/176 |

(Continued)

FOREIGN PATENT DOCUMENTS

| | | | |
|---|---|---|---|
| JP | 2009-48966 A | 3/2009 | |
| JP | 2009-170137 A | 7/2009 | |
| WO | WO 2013/035668 | * 3/2013 | ............ H01M 2/14 |

*Primary Examiner* — Ula C Ruddock
*Assistant Examiner* — Amanda Barrow
(74) *Attorney, Agent, or Firm* — Westerman, Hattori, Daniels & Adrian, LLP (57) ABSTRACT

An insulation sheet is disposed between a rectangular housing and an electrode body. A first side wall of the insulation sheet is disposed between a large-area side surface of the rectangular housing and the electrode body. The first side wall includes a first folded portion that is folded along an edge of the first side wall near a sealing plate. The first folded portion extends from an edge of the first side wall near the sealing plate toward a bottom surface of the rectangular housing and is disposed between the large-area side surface and the electrode body in such a way that the first folded portion overlaps the first side wall.

7 Claims, 11 Drawing Sheets

(56) References Cited

U.S. PATENT DOCUMENTS

| | | | | |
|---|---|---|---|---|
| 2010/0209750 A1* | 8/2010 | Nagamatsu | ......... | H01M 2/0262 |
| | | | | 429/94 |
| 2011/0052975 A1* | 3/2011 | Lee | .................... | H01M 2/0237 |
| | | | | 429/178 |
| 2011/0183181 A1* | 7/2011 | Moon | ................ | H01M 2/0237 |
| | | | | 429/136 |
| 2011/0236750 A1* | 9/2011 | Kohno | ................ | H01M 2/0404 |
| | | | | 429/181 |
| 2012/0052371 A1* | 3/2012 | Kim | .................... | H01M 2/027 |
| | | | | 429/179 |
| 2012/0160559 A1* | 6/2012 | Tsutsumi | .............. | H01M 2/021 |
| | | | | 174/551 |
| 2013/0037604 A1* | 2/2013 | Goldman | ............... | B65D 5/443 |
| | | | | 229/198.2 |
| 2014/0308555 A1* | 10/2014 | Hattori | ............. | H01M 10/0431 |
| | | | | 429/94 |

\* cited by examiner

RECTANGULAR SECONDARY BATTERY

CROSS REFERENCE TO RELATED APPLICATIONS

The present invention application claims priority to Japanese Patent Application No. 2014-112096 filed in the Japan Patent Office on May 30, 2014, the entire contents of which are incorporated herein by reference.

BACKGROUND OF THE INVENTION

Field of the Invention

The present invention relates to a rectangular secondary battery.

Description of Related Art

Non-aqueous electrolyte secondary batteries, typified by lithium-ion secondary batteries, are used in hybrid automobiles, electric automobiles, large-scale electricity storage systems, and the like. Preferably, the non-aqueous electrolyte secondary batteries have rectangular shapes so that the space efficiency or the cooling efficiency of the batteries can be improved.

In such a rectangular secondary battery, a planar electrode body and a liquid electrolyte are disposed in a rectangular housing. In general, the housing is made of a metal. In order to prevent direct contact between the housing and the electrode body, an insulation sheet is disposed between the housing and the electrode body.

For example, Japanese Published Unexamined Patent Application No. 2009-170137 (Patent Document 1) discloses that a planar electrode body, which is to be disposed in a metal housing, is wrapped in an insulation sheet that has been folded into a box-like shape. Japanese Published Unexamined Patent Application No. 2009-048966 (Patent Document 2) discloses that an electrode body, which is to be disposed in a housing, is wrapped in an insulation film having a bag-like shape.

Patent Document 2 also discloses that a gap between the housing and the electrode body is filled with a gap filling member, which is a member independent from the bag-shaped insulation film.

It is necessary to flexibly change the thicknesses and the areas of a positive electrode plate and a negative electrode plate of a rectangular secondary battery depending on capacity and characteristics required for the battery. Accordingly, it is also necessary to flexibly change the thickness of a planar electrode body, which includes the positive electrode plate and the negative electrode plate. On the other hand, it is desirable to use the same component as a rectangular housing for containing the electrode body in consideration of reducing costs and improving efficiency of battery manufacturing.

Accordingly, some batteries are designed so that the thickness of the planar electrode body is smaller than the inside dimension of the rectangular housing, and such batteries have a gap between the rectangular housing and the electrode body. In such cases, it is desirable that a member be disposed in the gap so as to fill the gap with the member in order to prevent a gap from remaining between the rectangular housing and the electrode body. By doing so, movement of the electrode body in the housing can be suppressed. Moreover, because the rectangular housing can press against the electrode body, the positive electrode plate and the negative electrode plate can be prevented from becoming separated from each other, so that decreased battery performance due to separation of the electrode plates can be suppressed.

However, for example, the method of disposing the gap filling member on the inner surface of the insulation film, which is described in Patent Document 2, may cause the following problem. Typically, a rectangular secondary battery is made through the following process. First, an electrode body is connected to a current collector, which has been attached to a sealing plate together with a terminal. Next, the electrode body is wrapped in an insulation sheet and inserted into a rectangular housing. An opening in the rectangular housing is sealed by joining contact portions of the rectangular housing and the sealing plate to each other by laser welding or the like. Subsequently, a liquid electrolyte is injected through a liquid injection hole formed in the sealing plate, and the liquid injection hole is sealed with a sealing plug.

In the case where a gap filling member, which is independent from the insulation film, is disposed on an inner surface of the insulation film, when the liquid electrolyte is injected through the liquid injection hole formed in the sealing plate, part of the liquid electrolyte may flow into a space between the insulation film and the gap filling member. The part of the liquid electrolyte, which has flowed into the space between the insulation film and the gap filling member, may cause the insulation film and the gap filling member to stick to each other. If this occurs, the part of the liquid electrolyte does not flow out or does not easily flow out of the space between the insulation film and the gap filling member. The part of the liquid electrolyte, which does not flow out or does not easily flow out of the space between the insulation film and the gap filling member, is non-usable electrolyte, because it is not supplied to the electrode body. Accordingly, such a liquid electrolyte, if present, does not contribute to improving the performance of the battery and may only increase the weight of the battery.

Although the above problem may be a minor problem for a single rectangular secondary battery, the problem may become serious when a large number of rectangular secondary batteries are used in combination. In particular, this problem is significant for rectangular secondary batteries mounted on automobiles, because reduction in weight is very important for such batteries.

BRIEF SUMMARY OF THE INVENTION

An object is of the present invention, which has been devised to solve the above problem, is to provide a rectangular secondary battery with which the amount of a liquid electrolyte that does not contribute to a battery reaction can be reduced.

According to an aspect of the present invention, there is provided a rectangular secondary battery including a rectangular housing that has an opening, a bottom surface, a pair of large-area side surfaces, and a pair of small-area side surfaces; a liquid electrolyte that is disposed in the rectangular housing; a sealing plate that seals the opening and that has an injection hole through which the liquid electrolyte is injected into the rectangular housing; an electrode body that has a planar shape, that is disposed in the rectangular housing, and that includes a positive electrode plate and a negative electrode plate; and an insulation sheet that is disposed between the rectangular housing and the electrode body. The insulation sheet includes a bottom portion disposed between the bottom surface of the rectangular housing and the electrode body, a first side wall disposed between one of the pair of large-area side surfaces and the electrode body, and a second side wall disposed between the other of the pair of large-area side surfaces and the electrode body. The first side wall includes a first folded portion that is folded along an edge of the first side wall near the sealing plate. The first folded portion extends from the edge of the first side wall near the sealing plate toward the bottom surface of the rectangular housing and is disposed between the one of the pair of large-area side surfaces and the electrode body in such a way that the first folded portion overlaps the first side wall.

In the rectangular secondary battery according to the aspect of the present invention, the insulation sheet is disposed between the rectangular housing and the electrode body. Therefore, direct contact between the rectangular housing and the electrode body can be prevented. Moreover, since the insulation sheet includes the first folded portion, a gap between the rectangular housing and the electrode body can be filled with the first folded portion.

Moreover, in the rectangular secondary battery according to the aspect of the present invention, the first folded portion is formed by being folded at the edge of the first side wall near the sealing plate. Therefore, in a step of injecting the liquid electrolyte, it is not likely that the liquid electrolyte flows into a gap between the first side wall and the first folded portion. Accordingly, the amount of the liquid electrolyte that does not contribute a battery reaction or that is not likely to contribute to the battery reaction can be reduced. Therefore, the weight of the rectangular secondary battery can be reduced without decreasing the battery performance of the rectangular secondary battery. In particular, a greater advantage can be obtained for a combination of batteries including a plurality of rectangular secondary batteries according to the aspect of the present invention.

DETAILED DESCRIPTION OF THE INVENTION

Hereinafter, an embodiment of the present invention will be described in detail with reference to the drawings. Note that the embodiment described below is an example used to illustrate the technical idea of the present invention, and the scope of the present invention is not limited to the embodiment.

First, the structure of a rectangular secondary battery according to the embodiment of the present invention will be described.

Figure 1:
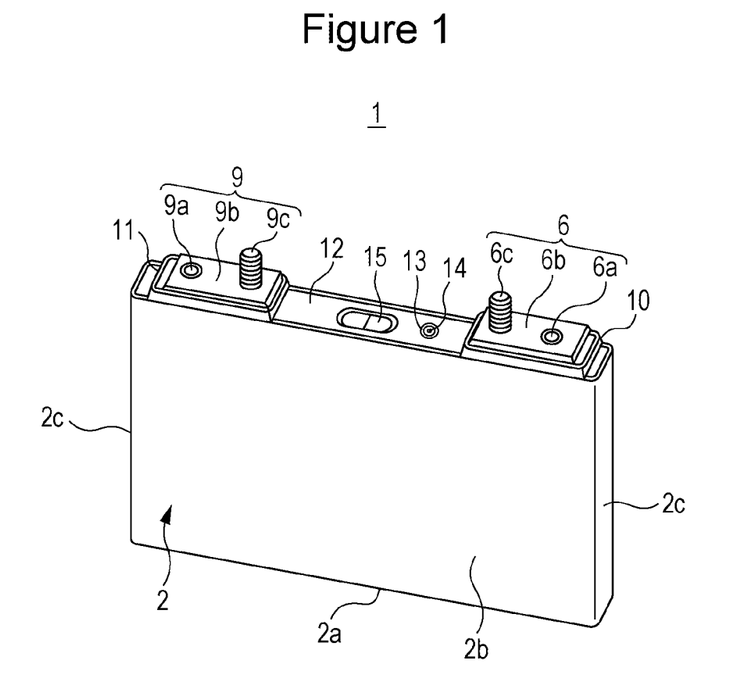
FIG. 1 is a perspective view of a rectangular secondary battery according to an embodiment.

As illustrated in FIG. 1, a rectangular secondary battery 1 according to the embodiment includes a rectangular housing 2, which is made of a metal, and a planar electrode body 3 and a liquid electrolyte, which are disposed in the rectangular housing 2. The planar electrode body 3 includes a positive electrode plate and a negative electrode plate. The rectangular housing 2 has an opening, a bottom surface 2a, a pair of large-area side surfaces 2b, and a pair of small-area side surfaces 2c. The opening of the rectangular housing 2 is sealed with a sealing plate 12. A positive electrode terminal 6 and a negative electrode terminal 9 are disposed on the sealing plate 12. The positive electrode terminal 6 is electrically connected to the positive electrode plate, and the negative electrode terminal 9 is electrically connected to the negative electrode plate. Preferably, the positive electrode terminal 6 includes a connection portion 6a extending through a through-hole formed in the sealing plate 12, an external terminal plate 6b disposed on the outer side of the sealing plate 12, and a bolt 6c. Preferably, the negative electrode terminal 9 includes a connection portion 9a extending through a through-hole formed in the sealing plate 12, an external terminal plate 9b disposed on the outer side of the sealing plate 12, and a bolt 9c. An insulating member 10 and an insulating member 11, each made of a resin, are respectively disposed between the positive electrode terminal 6 and the sealing plate 12 and between the negative electrode terminal 9 and the sealing plate 12. A gas discharge valve 15 is disposed in the sealing plate 12. If the pressure of the inside of the rectangular housing 2 becomes a predetermined value or higher, the gas discharge valve 15 becomes broken so that a gas inside the rectangular housing 2 is discharged to the outside. The sealing plate 12 has a liquid injection hole 13 through which the liquid electrolyte is injected into the rectangular housing 2. After the liquid electrolyte has been injected, the liquid injection hole 13 is sealed with a sealing plug 14. Preferably, the rectangular secondary battery 1 is a non-aqueous electrolyte secondary battery, such as a lithium-ion secondary battery.

Figure 2A:
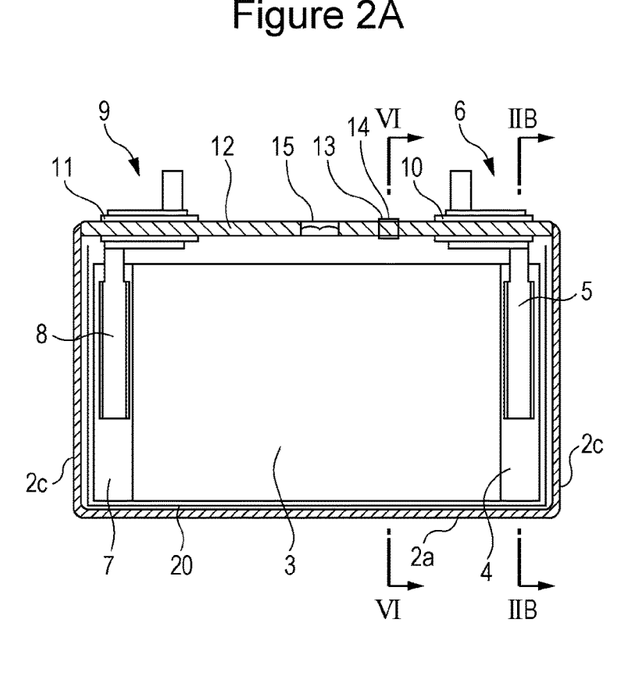
FIG. 2A is a front view of the rectangular secondary battery according to the embodiment seen through a rectangular housing and an insulation sheet.
Figure 2B:
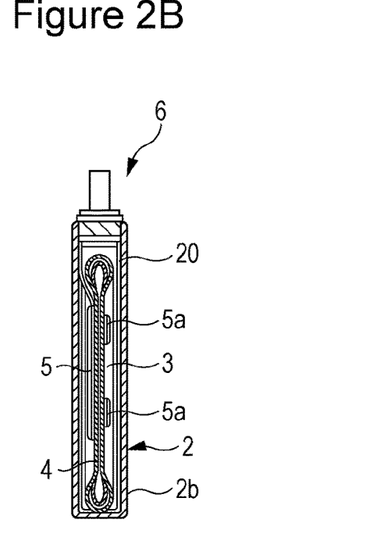
FIG. 2B is a sectional view taken along line IIB-IIB of FIG. 2A.

As illustrated in FIG. 2, the planar electrode body 3 includes a positive electrode core exposed portion 4, which is rolled up at one end portion thereof, and a negative electrode core exposed portion 7, which is rolled up at the other end portion thereof. The planar electrode body 3 is an electrode in which a positive electrode plate and a negative electrode plate are rolled up with a separator therebetween. The positive electrode plate includes the positive electrode core exposed portion 4, which is formed along the longitudinal direction at an end of the positive electrode plate in the width direction. The negative electrode plate includes the negative electrode core exposed portion 7, which is formed along the longitudinal direction at an end of the negative electrode plate in the width direction. The bottom surface and the side surfaces of the planar electrode body 3 are covered with an insulation sheet 20.

A positive electrode current collector 5 is welded to the positive electrode core exposed portion 4, so that the positive electrode current collector 5 and the positive electrode terminal 6 are electrically connected to each other. A negative electrode current collector 8 is welded to the negative electrode core exposed portion 7, so that the negative electrode current collector 8 and the negative electrode terminal 9 are electrically connected to each other. Positive electrode current collector supporting parts 5a may be disposed on a surface of the positive electrode core exposed portion 4, which has been rolled up, opposite to a surface on which the positive electrode current collector 5 is disposed. The rectangular secondary battery 1 may further include a circuit breaker in an electric path between the positive electrode plate and the positive electrode terminal 6. If the pressure of the inside of the battery becomes a predetermined value or higher, the circuit breaker shuts off the electric path between the positive electrode core exposed portion 4 and the positive electrode terminal 6.

Next, a method of manufacturing a rectangular secondary battery according to the embodiment of the present invention will be described.

Fabrication of Electrode Body

A positive electrode plate, which includes a positive electrode core and a positive electrode active material layer formed on the positive electrode core, is fabricated. The positive electrode core is made from an aluminum foil, and the positive electrode active material layer includes a lithium transition metal oxide. The positive electrode plate is cut so that a positive electrode core exposed portion is formed along the longitudinal direction at an end of the positive electrode plate in the width direction. A negative electrode plate, which includes a negative electrode core and a negative electrode active material layer formed on the negative electrode core, is fabricated. The negative electrode core is made from a copper foil, and the negative electrode active material layer includes a carbon material. The negative electrode plate is cut so that a negative electrode core exposed portion is formed along the longitudinal direction at an end of the negative electrode plate in the width direction. Next, a rolled electrode body is fabricated by rolling up the positive electrode plate and the negative electrode plate with a separator therebetween. At this time, the positive electrode plate and the negative electrode plate are rolled up so that the positive electrode core exposed portion is formed at one end thereof in the direction of the rolling axis and the negative electrode core exposed portion is formed at the other end thereof in the direction of the rolling axis. Then, the rolled electrode body is formed so as to have a planar shape.

Assembly of Sealing Plate

The positive electrode terminal 6 and the positive electrode current collector 5 are made to be electrically connected to each other, and the connection portion 6a of the positive electrode terminal 6 and the positive electrode current collector 5 are fixed to the sealing plate 12, which is made of aluminum. Preferably, an insulating member is disposed between the positive electrode terminal 6 and the sealing plate 12, and an insulating member is disposed between the positive electrode current collector 5 and the sealing plate 12. The connection portion 9a of the negative electrode terminal 9 and the negative electrode current collector 8 are made to be electrically connected to each other, and the negative electrode terminal 9 and the negative electrode current collector 8 are fixed to the sealing plate 12.

Preferably, an insulating member is disposed between the negative electrode terminal 9 and the sealing plate 12, and an insulating member is disposed between the negative electrode current collector 8 and the sealing plate 12.

A step of connecting the connection portion 6a and the bolt 6c to the external terminal plate 6b and a step of connecting the external terminal plate 9b and the bolt 9c to the connection portion 9a may be performed before performing a step of fixing the connection portion 6a and the connection portion 9a to the sealing plate, or may be performed after the step of fixing the connection portion 6a and the connection portion 9a to the sealing plate.

Connection of Electrode Body to Current Collector

The positive electrode current collector 5 is placed on one of outermost surfaces of the positive electrode core exposed portion 4, and the positive electrode current collector 5 and the positive electrode core exposed portion 4 are welded to each other. Preferably, the positive electrode current collector supporting parts 5a are disposed on the other outermost surface of the positive electrode core exposed portion 4. The negative electrode current collector 8 is placed on one of outermost surfaces of the negative electrode core exposed portion 7, and the negative electrode current collector 8 and the negative electrode core exposed portion 7 are welded to each other. Preferably, negative electrode current collector supporting parts are also disposed on the other outermost surface of the negative electrode core exposed portion 7.

Assembly of Battery

Figure 3:
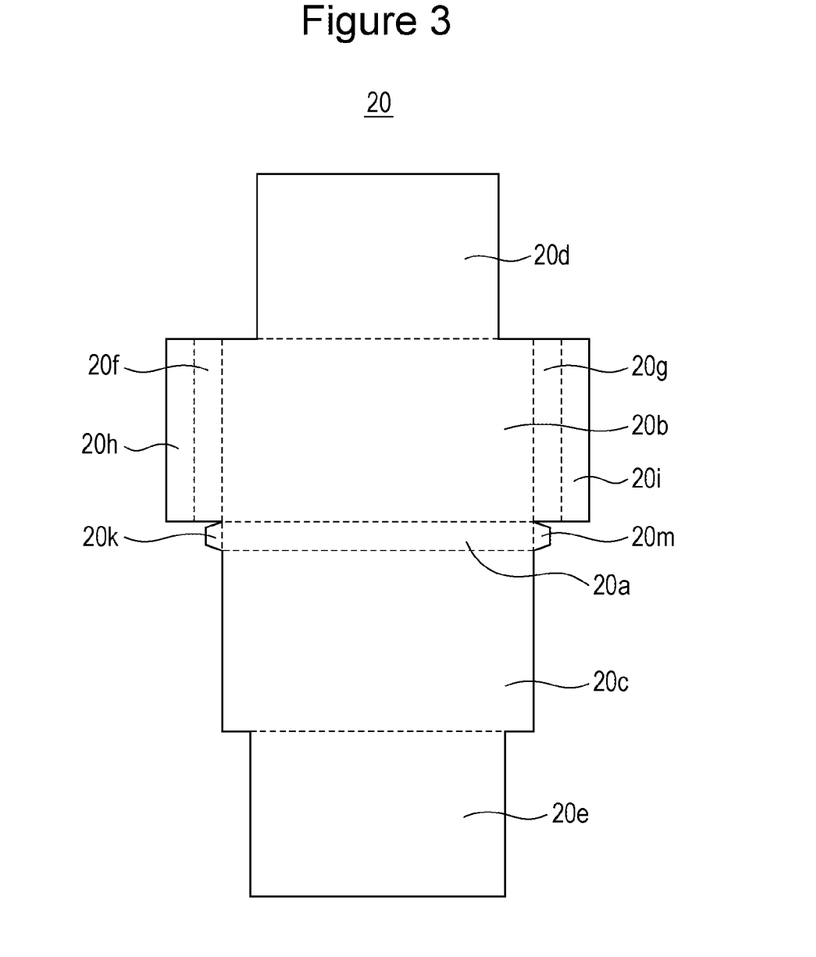
FIG. 3 is a developed view of the insulation sheet used in the rectangular secondary battery according to the embodiment.
Figure 5:
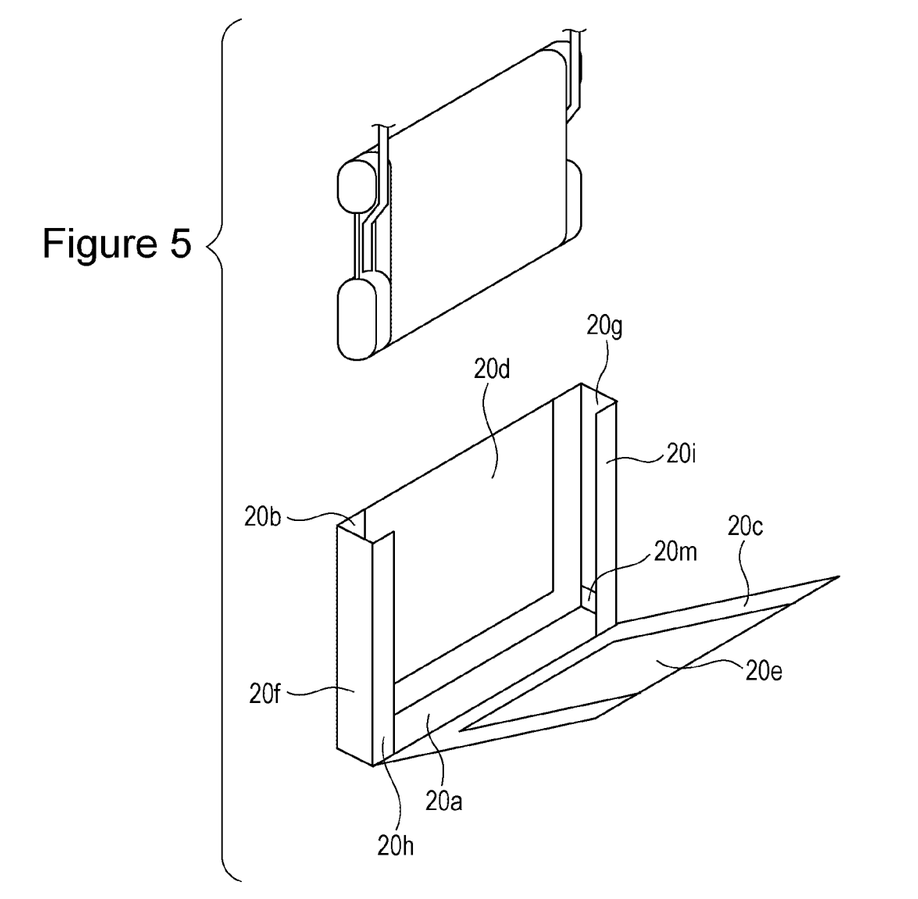
FIG. 5 illustrates a step of wrapping an electrode body in the insulation sheet.

The insulation sheet 20, which is made of a resin and illustrated in FIG. 3, is folded so as to have a box-like shape shown in FIG. 5, and the electrode body 3 is inserted into the insulation sheet 20. The planar electrode body 3, which is covered by the insulation sheet 20, is inserted into the rectangular housing 2, which is made of aluminum. Subsequently, connection portions of the sealing plate 12 and the rectangular housing 2 are welded to each other by laser welding or the like, and the opening in the rectangular housing 2 is sealed.

Injection of Liquid Electrolyte

A liquid electrolyte is injected through the liquid injection hole 13 formed in the sealing plate 12. Subsequently, the liquid injection hole is sealed with the sealing plug 14.

Next, referring to FIGS. 3 to 5, the insulation sheet 20 according to the embodiment will be described in detail. As illustrated in FIG. 3, the insulation sheet 20 includes a bottom portion 20a, a first side wall 20b, a second side wall 20c, a third side wall 20f, and a fourth side wall 20g. The bottom portion 20a is disposed between the electrode body 3 and the bottom surface 2a of the rectangular housing 2. The first side wall 20b is disposed between the electrode body 3 and one of the large-area side surfaces 2b of the rectangular housing 2. The second side wall 20c is disposed between the electrode body 3 and the other large-area side surface 2b of the rectangular housing 2. The third side wall 20f is disposed between the electrode body 3 and one of the small-area side surfaces 2c of the rectangular housing 2. The fourth side wall 20g is disposed between the electrode body 3 and the other small-area side surface 2c of the rectangular housing 2.

A first folded portion 20d is disposed near one end of the first side wall 20b opposite to the other end near the bottom portion 20a. A second folded portion 20e is disposed near one end of the second side wall 20c opposite to the other end near the bottom portion 20a. The second folded portion 20e may be omitted.

Figure 4:
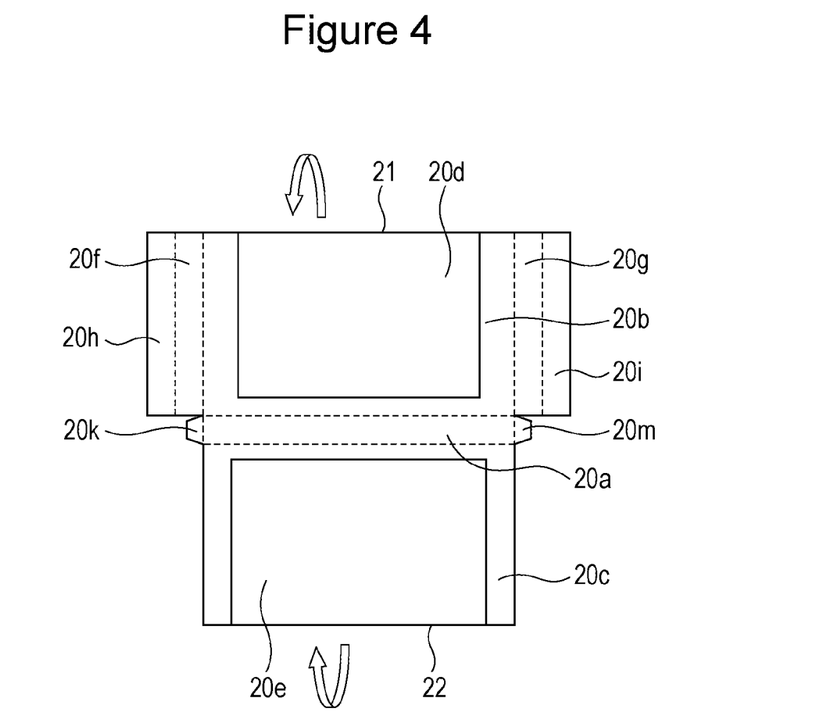
FIG. 4 illustrates the insulation sheet used in the rectangular secondary battery according to the embodiment in a state in which parts of the insulation sheet have been folded.

As illustrated in FIG. 4, the first folded portion 20d is folded along an edge 21 of the first side wall 20b (an edge to be located near the sealing plate 12 of the rectangular secondary battery 1). The second folded portion 20e is folded along an edge 22 of the second side wall 20c (an edge to be located near the sealing plate 12 of the rectangular secondary battery 1).

Preferably, the first folded portion 20d and the second folded portion 20e are each folded inward. With such a structure, the first folded portion 20d and the second folded portion 20e are respectively disposed between the electrode body 3 and the first side wall 20b and between the electrode body 3 and the second side wall 20c. Therefore, when the electrode body 3 covered by the insulation sheet 20 is being inserted into the rectangular housing 2, the first folded portion 20d or the second folded portion 20e is prevented from being caught in the opening in the rectangular housing 2.

The third side wall 20f is disposed at one end of the first side wall 20b in the width direction, and the fourth side wall 20g is disposed at the other end of the first side wall 20b in the width direction. The third side wall 20f includes a bent portion 20h. The bent portion 20h is bent substantially perpendicularly relative to the third side wall 20f and is disposed so as to overlap the second side wall 20c. The fourth side wall 20g includes a bent portion 20i. The bent portion 20i is bent substantially perpendicularly relative to the fourth side wall 20g and is disposed so as to overlap the second side wall 20c. The third side wall 20f, the fourth side wall 20g, the bent portion 20h, and the bent portion 20i may be omitted. However, preferably, the third side wall 20f and the fourth side wall 20g are provided in order to prevent contact between the electrode body 3 and the rectangular housing 2. It is not necessary that the third side wall 20f and the fourth side wall 20g be disposed so as to be connected to the first side wall 20b. For example, the third side wall 20f and the fourth side wall 20g may be disposed so as to be connected to the bottom portion 20a.

Bent pieces 20k and 20m are disposed at both ends of the bottom portion 20a in the width direction. Due to the presence of the bent pieces 20k and 20m, the electrode body 3, which is covered by the insulation sheet 20, can be smoothly inserted into the rectangular housing 2. A thin portion, cuts (perforations), or the like may be formed along each of a boundary between the bottom portion 20a and the bent piece 20k and a boundary between the bottom portion 20a and the bent piece 20m. However, preferably, cuts (such as perforations) are not formed along the boundary between the bottom portion 20a and the bent piece 20k and along the boundary between the bottom portion 20a and the bent piece 20m. With such a structure, contact between the positive electrode core exposed portion 4 or the negative electrode core exposed portion 7 and the rectangular housing 2 can be reliably prevented.

Next, advantages of the rectangular secondary battery according to the embodiment will be described. First, problems of a rectangular secondary battery according to a comparative example will be described.

Figure 8:
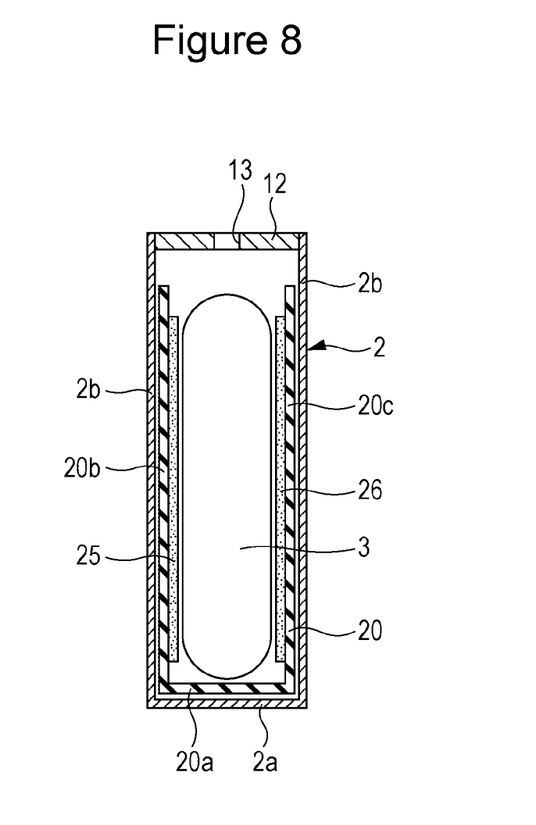
FIG. 8, which corresponds to FIG. 6, is a sectional view of a rectangular secondary battery according to a comparative example.

As illustrated in FIG. 8, in order to fill a gap between the electrode body 3 and the rectangular housing 2, a filling member 25, which is independent from the insulation sheet 20, may be disposed between the first side wall 20b of the insulation sheet 20 and the electrode body 3; and a filling member 26, which is independent from the insulation sheet 20, may be disposed between the second side wall 20c of the insulation sheet 20 and the electrode body 3.

Figure 9A:
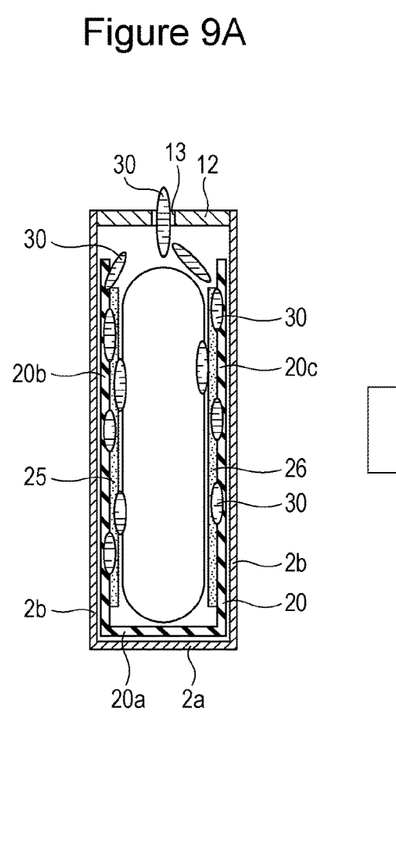
FIG. 9A, which corresponds to FIG. 8, illustrates a step of injecting a liquid electrolyte, and FIG. 9B, which corresponds to FIG. 8, illustrates a state after the liquid electrolyte has been injected.
Figure 9B:
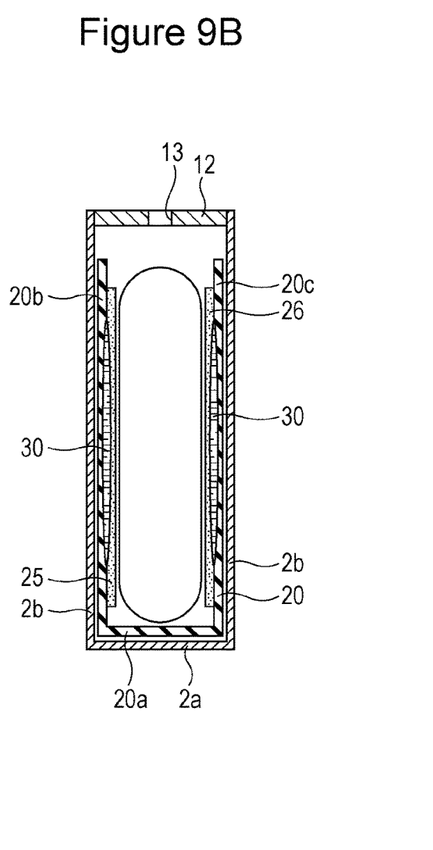

In the rectangular secondary battery having such a structure, as illustrated in FIG. 9A, when a liquid electrolyte 30 is injected through the liquid injection hole 13 formed in the sealing plate 12, part of the liquid electrolyte 30 flows into a gap between the first side wall 20b and the filling member 25 and into a gap between the second side wall 20c and the filling member 26. The part of the liquid electrolyte 30 that has flowed into the gaps causes the first side wall 20b and the filling member 25 to be closely attached to each other and causes the second side wall 20c and the filling member 26 to be closely attached to each other. As a result, as illustrated in FIG. 9B, it may become difficult for the part of the liquid electrolyte 30 to flow out of the gap between the first side wall 20b and the filling member 25 and out of the gap between the second side wall 20c and the filling member 26.

The part of the liquid electrolyte 30 that has flowed into the gap does not contribute to charging operation of the battery and does not contribute to improvement of the battery performance. Accordingly, due to the presence of such a part of the liquid electrolyte 30 in the gap, the size and the weight of the rectangular secondary become unnecessarily large.

Figure 6:
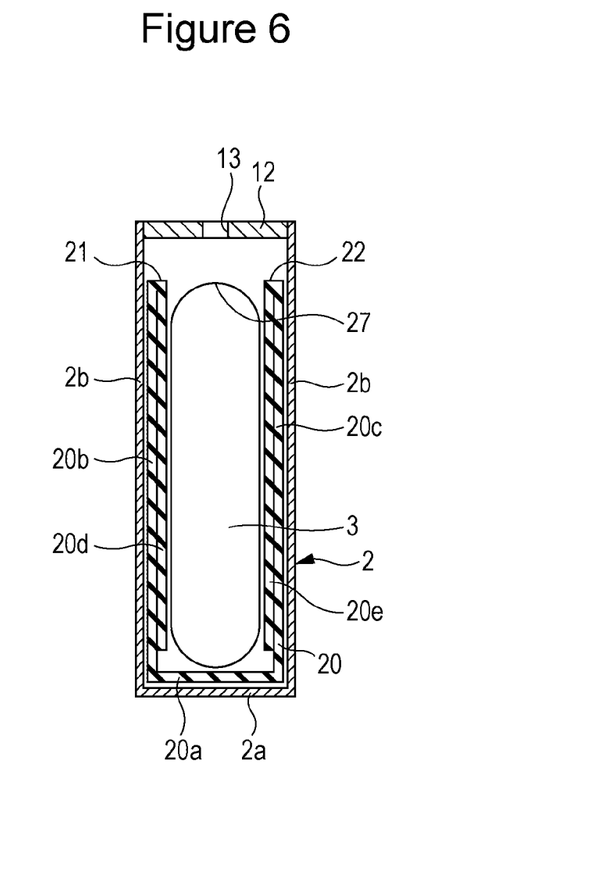
FIG. 6 is a sectional view taken along line VI-VI of FIG. 2.

In contrast, in the rectangular secondary battery 1 according to the embodiment, as illustrated in FIG. 6, the first side wall 20b of the insulation sheet 20 includes the first folded portion 20d. The first folded portion 20d is folded along the edge 21 of the first side wall 20b near the sealing plate 12. Moreover, the second side wall 20c includes the second folded portion 20e. The second folded portion 20e is folded along the edge 22 of the second side wall 20c near the sealing plate 12.

Figure 7:
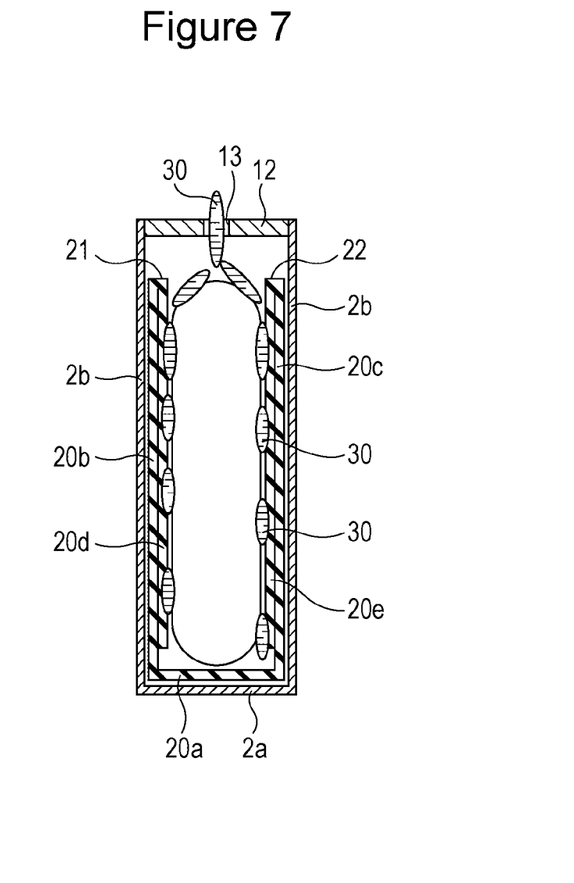
FIG. 7, which corresponds to FIG. 6, illustrates a step of injecting a liquid electrolyte.

Thus, in the rectangular secondary battery 1 according to the embodiment, the gaps between the electrode body 3 and the rectangular housing 2 are filled with folded portions of the insulation sheet 20. Accordingly, as illustrated in FIG. 7, when the liquid electrolyte 30 is injected through the liquid injection hole 13 formed in the sealing plate 12, the liquid electrolyte 30 does not flow into the gap between the first side wall 20b and the first folded portion 20d of the insulation sheet 20 and does not flow into the gap between the second side wall 20c and the second folded portion 20e. Therefore, no part of the liquid electrolyte 30 becomes non-usable, in contrast to the rectangular secondary battery according to the comparative example. Another member may be disposed between the first side wall 20b and the first folded portion 20d, and the first side wall 20b and the first folded portion 20d may be disposed so as to overlap each other with the other member therebetween.

A thin portion or a plurality of cuts (such as perforations) that are formed at intervals may be formed along each of the edges 21 and 22, which are used as fold lines. The cuts may extend through the insulation sheet 20. In the case where cuts extending through the insulation sheet 20 are formed along the edges 21 and 22, a small amount of the liquid electrolyte 30 may flow into the gap between the first side wall 20b and the first folded portion 20d and into the gap between the second side wall and the second folded portion 20e. However, as compared with the rectangular secondary battery according to the comparative example, the amount of unused liquid electrolyte 30 can be effectively reduced.

In the case where cuts are formed along the edges 21 and 22, which are used as fold lines, preferably, the positions of the edges 21 and 22 are nearer to (higher than) the sealing plate 12 than an end of the electrode body 3 near the sealing plate 12 is. In this case, the liquid electrolyte 30 can be effectively prevented from flowing into the gap between the first side wall 20b and the first folded portion 20d and into the gap between the second side wall and the second folded portion 20e.

Preferably, an end portion of the first folded portion 20*d* near the bottom surface 2*a* of the rectangular housing 2 is bonded to the first side wall 20*b*. Preferably, bonding of the end portion is performed by welding, but may be performed by using an adhesive. Preferably, an end portion of the second folded portion 20*e* near the bottom surface 2*a* of the rectangular housing 2 is bonded to the second side wall 20*c*.

Figure 10:
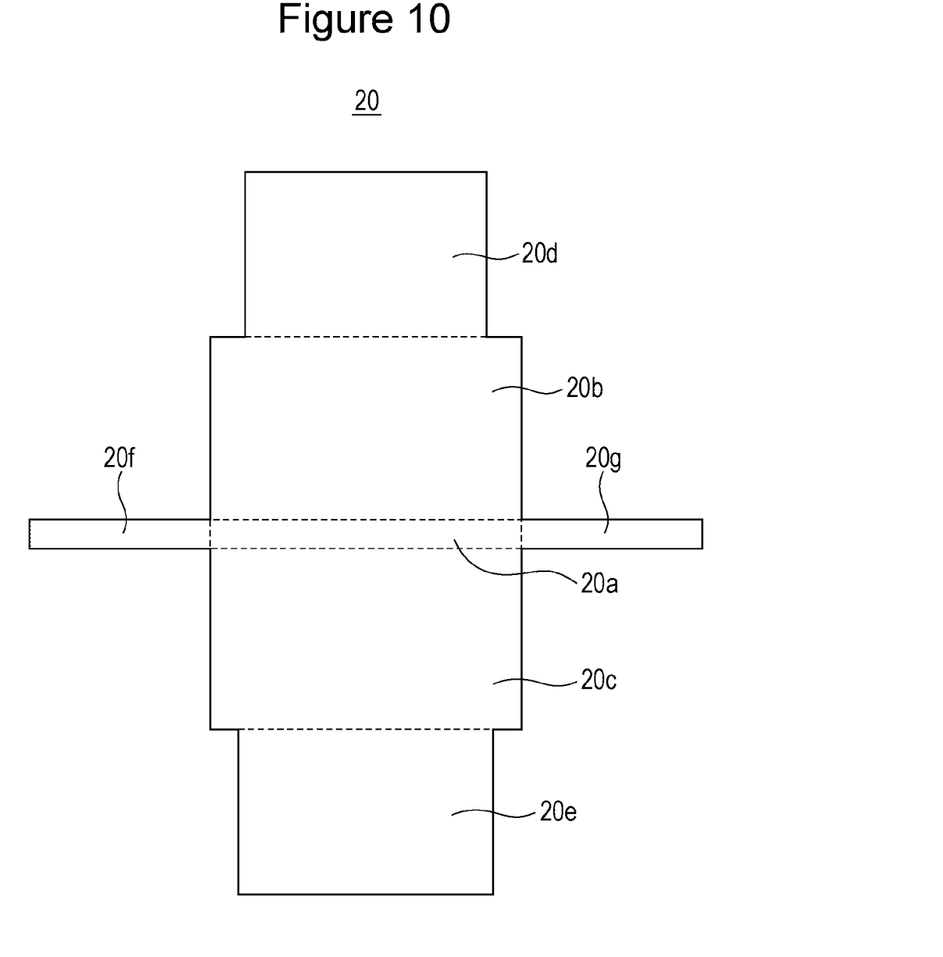
FIG. 10 is a developed view of an insulation sheet used in a rectangular secondary battery according to a first modification.

The structure of the insulation sheet 20 is not limited to that of the embodiment described above. For example, as illustrated in FIG. 10, the third side wall 20*f* and the fourth side wall 20*g* may be formed so as to be connected to the bottom portion 20*a*.

Figure 11:
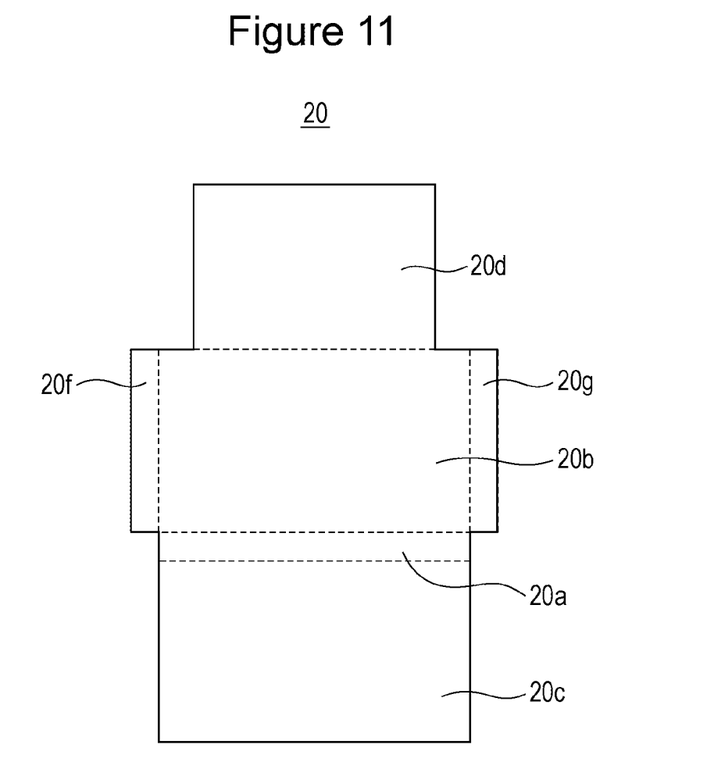
FIG. 11 is a developed view of an insulation sheet used in a rectangular secondary battery according to a second modification.

As illustrated in FIG. 11, the insulation sheet 20 may only include the bottom portion 20*a*, the first side wall 20*b*, the second side wall 20*c*, the first folded portion 20*d*, the third side wall 20*f*, and the fourth side wall 20*g*.

Others

Preferably, the insulation sheet 20 is a resin sheet. For example, the insulation sheet is made of polypropylene (PP), polyethylene (PE), polyphenylene sulfide (PPS), polyetheretherketone (PEEK), polyamide, or the like. Preferably, the insulation sheet is a non-porous sheet.

The rectangular housing 2 and the sealing plate 3 need not have any of a positive polarity and a negative polarity. The rectangular housing 2 and the sealing plate 3 may have one of the positive polarity and the negative polarity.

The positive electrode plate and the negative electrode plate can be made from a known material by using a known method. The liquid electrolyte may be an aqueous liquid electrolyte or may be a non-aqueous liquid electrolyte.

The present invention is particularly effective for a battery including a planar electrode in which a positive electrode plate and a negative electrode plate are rolled up with a separator therebetween.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A rectangular secondary battery comprising:
    a rectangular housing that has an opening, a bottom surface, a pair of large-area side surfaces, and a pair of small-area side surfaces;
    a liquid electrolyte that is disposed in the rectangular housing;
    a sealing plate that seals the opening and that has an injection hole through which the liquid electrolyte is injected into the rectangular housing;
    an electrode body that has a planar shape, that is disposed in the rectangular housing, and that includes a positive electrode plate and a negative electrode plate; and
    an insulation sheet that is disposed between the rectangular housing and the electrode body, the insulation sheet including
        a bottom portion disposed between the bottom surface of the rectangular housing and the electrode body,
        a first side wall disposed between one of the pair of large-area side surfaces and the electrode body, and
        a second side wall disposed between the other of the pair of large-area side surfaces and the electrode body,
    wherein the first side wall includes a first folded portion that is folded along an edge of the first side wall near the sealing plate, and
    wherein the first folded portion extends from the edge of the first side wall near the sealing plate toward the bottom surface of the rectangular housing and is disposed between one of the pair of large-area side surfaces and the electrode body in such a way that the first folded portion overlaps with the first side wall.

2. The rectangular secondary battery according to claim 1, wherein the electrode body is a rolled electrode body in which the positive electrode plate and the negative electrode plate are rolled up with a separator therebetween.

3. The rectangular secondary battery according to claim 1, wherein the edge of the first side wall near the sealing plate has a plurality of cuts formed along the edge of the first side wall near the sealing plate or a thin portion extending along the edge of the first side wall near the sealing plate.

4. The rectangular secondary battery according to claim 1, wherein an end portion of the first folded portion near the bottom surface of the rectangular housing is bonded to the first side wall.

5. The rectangular secondary battery according to claim 1, wherein the second side wall includes a second folded portion that is folded along an edge of the second side wall near the sealing plate, and
    wherein the second folded portion extends from an edge of the second side wall near the sealing plate toward the bottom surface of the rectangular housing and is disposed between the other of the pair of large-area side surfaces and the electrode body in such a way that the second folded portion overlaps the second side wall.

6. The rectangular secondary battery according to claim 1, wherein the insulation sheet includes a third side wall and a fourth side wall,
    wherein the third side wall is disposed between one of the pair of the small-area side surfaces and the electrode body, and
    wherein the fourth side wall is disposed between the other of the pair of small-area side surfaces and the electrode body.

7. The rectangular secondary battery according to claim 1, wherein the edge of the first side wall near the sealing plate is nearer to the sealing plate than an end of the electrode body near the sealing plate is.

* * * * *